(12) United States Patent
Hermans

(10) Patent No.: US 12,208,359 B2
(45) Date of Patent: Jan. 28, 2025

(54) DRYING DEVICE AND METHOD FOR DRYING A COMPRESSED GAS

(71) Applicant: ATLAS COPCO AIRPOWER, NAAMLOZE VENNOOTSCHAP, Wilrijk (BE)

(72) Inventor: Hans Maria Karel Hermans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 569 days.

(21) Appl. No.: 17/599,659

(22) PCT Filed: May 11, 2020

(86) PCT No.: PCT/IB2020/054432
§ 371 (c)(1),
(2) Date: Sep. 29, 2021

(87) PCT Pub. No.: WO2020/250054
PCT Pub. Date: Dec. 17, 2020

(65) Prior Publication Data
US 2022/0193603 A1 Jun. 23, 2022

(30) Foreign Application Priority Data

Jun. 12, 2019 (BE) .................................. 2019/5375
Jun. 12, 2019 (BE) .................................. 2019/5376
(Continued)

(51) Int. Cl.
*B01D 53/26* (2006.01)
*B01D 53/04* (2006.01)

(52) U.S. Cl.
CPC ....... *B01D 53/261* (2013.01); *B01D 53/0438* (2013.01); *B01D 2259/40003* (2013.01); *B01D 2259/4009* (2013.01); *B01D 2259/402* (2013.01)

(58) Field of Classification Search
CPC .............. B01D 53/261; B01D 53/0438; B01D 2259/40003; B01D 2259/4009;
(Continued)

(56) References Cited

U.S. PATENT DOCUMENTS 3,850,592 A 11/1974 Huffman
2009/0049984 A1* 2/2009 Vertriest .............. B01D 53/261
95/91
(Continued)

FOREIGN PATENT DOCUMENTS

CN 102872688 A 1/2013
CN 109499413 A * 3/2019 ............ B01F 25/312
(Continued)

OTHER PUBLICATIONS

International Search Report and Written Opinion in corresponding PCT Application No. PCT/IB2020/054432, dated Aug. 4, 2020.
(Continued)

*Primary Examiner* — Robert A Hopkins
*Assistant Examiner* — Qianping He
(74) *Attorney, Agent, or Firm* — BACON&THOMAS, PLLC

(57) ABSTRACT

Drying device for drying compressed gas which includes at least two vessels with regenerable desiccant and an adjustable valve system which is such that a vessel can dry compressed gas, while the other vessel is being regenerated, whereby by regulating the valve system, the vessels can each in turn dry gas. The drying device includes a regeneration pipe for supplying a regeneration gas which runs from an
(Continued)

outlet for dried gas to the valve system, and in which heating means are provided, whereby the drying device is provided with a return pipe for returning the regeneration gas to an inlet, running from the valve system to an inlet pipe which connects to said inlet and in which a venturi ejector is mounted, to which said return pipe is connected, and that regulating means are provided for regulating the flow of gas going through the venturi ejector.

8 Claims, 2 Drawing Sheets

(30) Foreign Application Priority Data

Jun. 12, 2019 (BE) .................................. 2019/5377
Mar. 13, 2020 (BE) .................................. 2020/5176

(58) Field of Classification Search
CPC ...... B01D 2259/402; B65G 2812/1633; B65G 2812/1641; B01F 25/312; B01F 25/3125; B01F 25/31243
USPC .......................................................... 95/123
See application file for complete search history.

(56) References Cited

U.S. PATENT DOCUMENTS

| | | |
|---|---|---|
| 2012/0012005 A1 | 1/2012 | Burke |
| 2012/0048382 A1* | 3/2012 | James ................... B01D 3/105 137/1 |
| 2014/0260967 A1 | 9/2014 | Gitschlag |
| 2018/0104645 A1* | 4/2018 | Vertriest .............. B01D 53/261 |

FOREIGN PATENT DOCUMENTS

| | | |
|---|---|---|
| EP | 3446770 A1 | 2/2019 |
| WO | 2016179668 A1 | 11/2016 |

OTHER PUBLICATIONS

Belgium Search Report in corresponding Belgium Application No. 202005176, dated May 4, 2020.

* cited by examiner

DRYING DEVICE AND METHOD FOR DRYING A COMPRESSED GAS

BACKGROUND OF THE INVENTION

In particular, the invention relates to drying devices which are provided with an inlet for compressed gas to be dried and an outlet for dried compressed gas, whereby the drying device comprises at least two vessels containing a regenerable desiccant and an adjustable valve system connecting said inlet and outlet to said vessels, whereby the adjustable valve system is configured such that at least one vessel can dry compressed gas, while the other vessel is being regenerated, and that by regulating the valve system, the vessels can each in turn dry compressed gas.

Regenerable desiccant refers to a desiccant that is able to extract moisture from a gas by means of adsorption and which, when saturated with moisture, can be dried by sending a so-called regeneration gas through it. This process is also called regeneration of the desiccant. Typically, the regeneration gas is a warm gas.

Although there is mention here of the principle of adsorption, the invention is also applicable to the principle of absorption.

When a vessel will dry, it will take up the moisture from the compressed gas to be dried, such that the desiccant becomes saturated. This means that it cannot take up any or little additional moisture.

Subsequently this vessel is then regenerated, whereby typically a warm gas, for example warm air, is guided through it. This warm gas will extract moisture from the desiccant and thus regenerate it.

Subsequently the vessel can optionally first be cooled before using it again to dry compressed gas.

Devices are already known which are configured such that a part of the dried compressed gas is used to regenerate a vessel.

After having been used for regeneration purposes, the regeneration gas is either blown off or recombined with the compressed gas to be dried.

Although the advantage of recovering the regeneration gas is that there is no loss of compressed gas, it must be ensured that the regeneration gas can be recombined with the compressed gas to be dried.

Indeed, the regeneration will trigger a pressure drop, such that the regeneration gas will be at a slightly lower pressure than the compressed gas to be dried, such that an external force is needed to recombine the regeneration gas with the compressed gas to be dried.

To recombine the regeneration gas with the compressed gas to be dried, a venturi ejector can be used, which will generate an underpressure when the compressed gas to be dried flows through it. Under the influence of this underpressure, the regeneration gas can be sucked in as it were by the venturi ejector and thus recombined with the compressed gas to be dried.

A disadvantage is that in such venturi ejector a relatively large pressure drop can take place.

SUMMARY OF THE INVENTION

The purpose of the present invention is to provide a solution to at least one of the aforementioned and/or other disadvantages.

To this end, the invention relates to a drying device for drying compressed gas, said drying device being provided with an inlet for compressed gas to be dried and an outlet for dried compressed gas, whereby the drying device comprises at least two vessels containing a regenerable desiccant and an adjustable valve system consisting of a first valve block and a second valve block connecting said inlet, respectively said outlet, to said vessels, whereby the adjustable valve system is configured such that at least one vessel can dry compressed gas, while the other vessel is being regenerated, and that by regulating the valve system, the vessels can each in turn dry compressed gas, whereby the drying device is further provided with a regeneration pipe for supplying a regeneration gas to the vessel that is being regenerated, said regeneration pipe running from the outlet for dried compressed gas to the second valve block, whereby in the regeneration pipe heating means are provided for the regeneration gas, whereby the drying device is further provided with a return pipe for returning the regeneration gas after passage through the vessel that is being regenerated to said inlet, said return pipe running from the first valve block to an inlet pipe which connects to said inlet for compressed gas to be dried, whereby in the inlet pipe a venturi ejector is mounted, to which said return pipe is connected, and that regulating means are provided for regulating the flow of compressed gas to be dried going through the venturi ejector.

This provides the advantage that by regulating the flow through the venturi ejector, the pressure drop and the associated energy loss can be regulated. Indeed, by reducing the flow through the venturi ejector, less regeneration gas will be sucked in and the pressure drop will be lower.

In other words it is possible to ensure that just enough flow goes through the venturi ejector, such that just enough regeneration gas is sucked in to allow for a good regeneration of the vessel to be regenerated, but also not more than that.

Regulating the flow that goes through the venturi ejector can be done in different ways.

In a practical embodiment said regulating means are formed by the fact that said venturi ejector is an adjustable venturi ejector is, which is configured such that the flow going through it can be regulated.

In an alternative practical embodiment said regulating means comprise a bypass pipe provided over the venturi ejector, whereby a valve is mounted in the bypass pipe.

This valve is for example a butterfly valve or throttle valve.

By opening the valve more or less, the flow through the bypass pipe, and thus indirectly also through the venturi ejector is regulated.

The invention also relates to a drying device for drying compressed gas, said drying device being provided with an inlet for compressed gas to be dried and an outlet for dried compressed gas, whereby the drying device comprises at least two vessels containing a regenerable desiccant and an adjustable valve system consisting of a first valve block and a second valve block connecting said inlet, respectively said outlet, to said vessels, whereby the adjustable valve system is configured such that at least one vessel can dry compressed gas, while the other vessel is being regenerated, and that by regulating the valve system, the vessels can each in turn dry compressed gas, whereby the drying device is further provided with a regeneration pipe for supplying a regeneration gas to the vessel that is being regenerated, said regeneration pipe running from the outlet for dried compressed gas to the second valve block, whereby in the regeneration pipe heating means are provided for the regeneration gas, whereby the drying device is further provided with a return pipe for returning the regeneration gas after passage through the vessel that is being regenerated to said inlet, said return pipe running from the first valve block to an inlet pipe which connects to said inlet for compressed gas to be dried, whereby a blower is mounted in the regeneration pipe, whereby the blower is an adjustable blower.

Said blower forms an alternative for the venturi ejector, i.e. the blower will have the same function as the venturi ejector.

The invention also relates to a method for drying compressed gas using a drying device which is provided with an inlet for compressed gas to be dried and an outlet for dried compressed gas, whereby an inlet pipe is connected to the inlet, whereby the drying device comprises at least two vessels containing a regenerable desiccant and an adjustable valve system connecting said inlet, respectively said outlet, to said vessels, whereby at least one vessel will dry compressed gas, while the other vessel is being regenerated, whereby by regulating the valve system the vessels each in turn dry compressed gas, whereby the method comprises the following steps:

providing a regeneration gas by tapping off a part of the dried, compressed gas at the outlet;

heating this tapped off regeneration gas before it is guided through the vessel that is being regenerated;

returning the regeneration gas, after passage through the vessel that is being regenerated, to said inlet pipe;

returning the regeneration gas to said inlet pipe by means of a venturi ejector, and whereby the method further comprises the step of regulating the flow of the regeneration gas that is sent to the inlet pipe.

It is clear that such method possesses the same advantages as the drying device according to the invention.

Preferably a drying device according to the invention is used to apply the method.

Preferably, to regulate the flow of the regeneration gas that is sent to the inlet pipe, an adjustable venturi ejector is used.

Preferably, part of the compressed gas to be dried is sent via a bypass pipe over the venturi ejector to regulate the flow of the regeneration gas that is sent to the inlet pipe, whereby a valve is mounted in said bypass pipe.

The invention also relates to a method for drying compressed gas using a drying device which is provided with an inlet for compressed gas to be dried and an outlet for dried compressed gas, whereby an inlet pipe is connected to the inlet, whereby the drying device comprises at least two vessels which contain a regenerable desiccant and an adjustable valve system connecting said inlet, respectively said outlet, to said vessels, whereby the adjustable valve system is such that at least one vessel will dry compressed gas, while the other vessel is being regenerated, whereby by regulating the valve system the vessels each in turn dry compressed gas, whereby the method comprises the following steps:

providing a regeneration gas by tapping off a part of the dried, compressed gas at the outlet;

heating this tapped off regeneration gas before it is guided through the vessel that is being regenerated;

returning the regeneration gas, after passage through the vessel that is being regenerated, to said inlet pipe;

further providing an adjustable blower (23) in the drying device (1), said adjustable blower (23) being mounted in a regeneration pipe (10) running from the outlet (8) for dried compressed gas to said valve system, whereby the method further comprises the step of regulating the flow of the regeneration gas that is returned to said inlet pipe (13), by regulating the blower (23).

It is clear that this method also possesses the same advantages as the drying device according to the invention.

Preferably a drying device according to the invention is used to apply the method.

BRIEF DESCRIPTION OF THE DRAWINGS

With the intention of better showing the characteristics of the invention, a few preferred embodiments of a drying device for drying compressed gas according to the invention are described hereinafter by way of an example, without any limiting nature, with reference to the accompanying figures, wherein:

FIG. 3 shows another practical embodiment of FIG. 1;

DETAILED DESCRIPTION OF THE INVENTION

Figure 1:
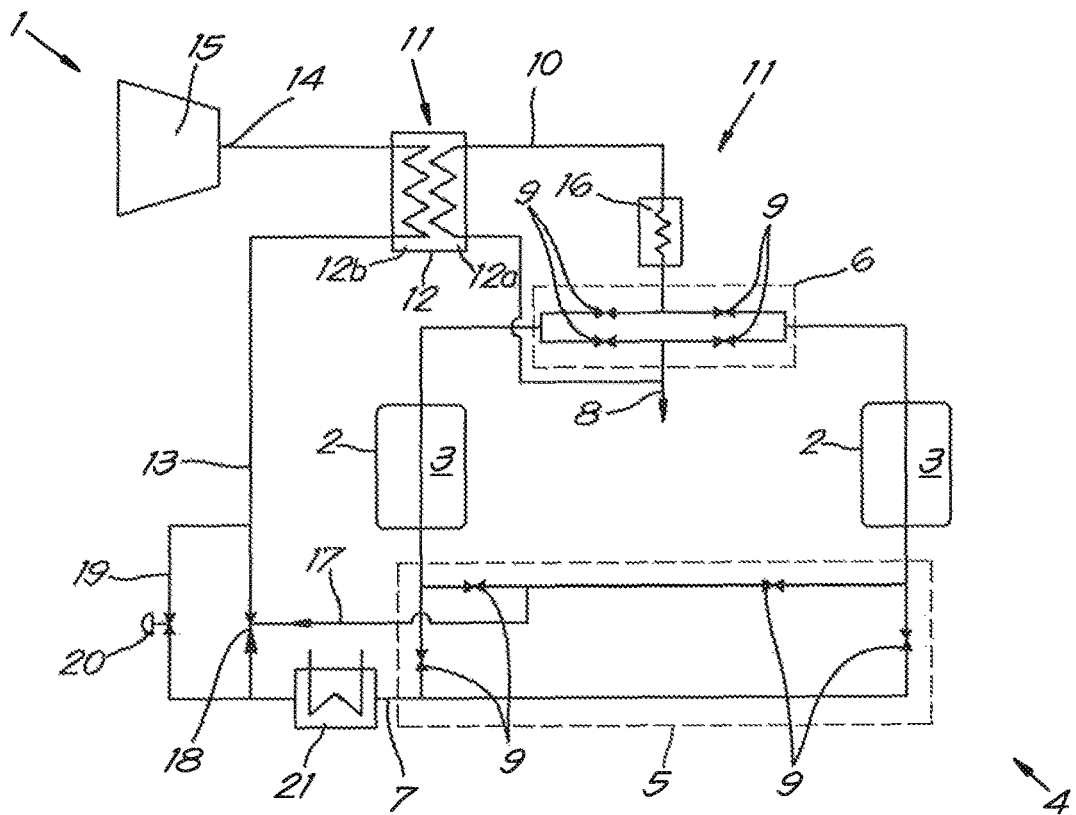
FIG. 1 schematically shows a drying device according to the invention.

The drying device 1 according to the invention for drying compressed gas schematically shown in FIG. 1 essentially comprises two vessels 2 containing a regenerable desiccant 3.

This regenerable desiccant 3 is also called desiccant.

Of course it is possible there are more than two vessels 2.

The drying device 1 further comprises a valve system 4 that consists of a first valve block 5 and a second valve block 6.

The first valve block 5 will connect the vessels 2 with an inlet 7 for compressed gas to be dried, while the second valve block 6 will connect the vessels 2 to an outlet 8 for dried compressed gas.

Said valve blocks 5, 6 are a system of different pipes and valves that can be regulated such that at least one vessel 2 is always being regenerated or possibly cooled, while the other vessel 2 or the other vessels 2 dry the compressed gas, whereby by regulating the valve system 4 the vessels 2 will each in turn dry compressed gas.

In this case each valve block 5, 6 comprises four butterfly valves 9 or throttle valves.

The drying device 1 is further provided with a regeneration pipe 10 for supplying a regeneration gas to the vessel 2 that is being regenerated.

The dried, compressed gas will be used as regeneration gas.

To this end the regeneration pipe 10 runs from the outlet 8 for dried compressed gas to the second valve block 6, whereby in the regeneration pipe 10 heating means 11 are provided for the regeneration gas.

In this case, said heating means 11 comprise a heat exchanger 12, the primary section 12a of which is mounted in the regeneration pipe 10 and the secondary section 12b is mounted in an inlet pipe 13 running from said inlet 7 for compressed gas to be dried to the exit 14 of a compressor 15.

In this case, said heating means 11 also comprise an external heat source 16, which in the example is an electric heating mounted in the regeneration pipe 10. The external heat source 16 is located downstream from the heat exchanger 12.

The drying device 1 according to the invention is also provided with a return pipe 17 for returning the regeneration gas after passage through the vessel 2 that is being regenerated to said inlet 7 via the inlet pipe 13.

To this end, the return pipe 17 runs from the first valve block 5 to said inlet pipe 13 which connects to said inlet 7 for compressed gas to be dried.

A venturi ejector 18 is mounted in the inlet pipe 13, to which said return pipe 17 is connected, whereby the flow of compressed gas to be dried that goes through the venturi ejector 18, can be regulated.

In the example shown this regulation is made possible because a bypass pipe 19 is provided over the venturi ejector 18, whereby a valve 20 is mounted in the bypass pipe 19.

This valve 20 allows the flow through the bypass pipe 19 to be regulated, and thus indirectly the flow through the venturi ejector 18 as well.

Finally, a cooler 21 is mounted in the inlet pipe 13, downstream from the venturi ejector 18.

The operation of the drying device 1 is very simple and as follows.

During the operation of the drying device 1, the warm compressed air will reach the inlet 7 via the cooler 21.

The cooled compressed gas will be guided via the first valve block 5 to the vessel 2 that will dry. In FIG. 1 this is the vessel 2 on the right.

After passage through this vessel 2 the compressed gas is dried and can leave the drying device 1 via the outlet 8.

A part of the dried compressed gas is tapped off via the regeneration pipe 10.

This tapped off, dried compressed regeneration gas is heated via the heat exchanger 12 by extracting heat from the compressed gas to be dried.

Note that consequently said dryer 21 can be executed smaller as the compressed gas to be dried has already been subjected to a first cooling in the heat exchanger 12.

Subsequently the warm, dry compressed regeneration gas passes along the external heat source 16 in the regeneration pipe 10, which can optionally heat up the gas more.

The regeneration pipe 10 guides the now hot and dry compressed regeneration gas to the second valve block 6, which ensures it is guided through the vessel to be regenerated 2.

After passage through the vessel 2, the regeneration gas is heated and saturated with moisture.

Via the return pipe 17 the warm, saturated compressed regeneration gas is recombined with the compressed gas to be dried coming from the compressor 15.

The venturi ejector 18 will be used for this.

When the compressed gas to be dried coming from the compressor 15 flows through the venturi ejector 18, it will create a vacuum. The size of this vacuum depends on the flow going through it.

The size of the vacuum will determine how much regeneration gas will be sucked in and will thus determine how much regeneration gas is tapped off.

By opening the valve 20 of the bypass pipe 19 more or less, the flow of regeneration gas can thus also be regulated.

In this way the valve 20 can be regulated such that sufficient regeneration gas flows through the vessel to be regenerated 2, but also not more than necessary.

In this way the pressure drop over the venturi ejector 18, and the associated energy loss, can be kept as low as possible.

To determine how much regeneration gas is needed, and thus how the valve 20 in the bypass pipe 19 must be regulated, some of the things that will be considered are how long the other vessel 2 can dry, i.e. how much time is available for the regeneration and/or the physical parameters of the regeneration gas such as temperature and relative humidity and/or the saturation level of the desiccant 3 in the vessel to be regenerated 2 and/or the dew point, etc.

This regeneration step as described above is executed until the vessel 2 is completely regenerated.

A possible cooling step can still be executed, whereby a cooling gas is sent through the vessel 2 in question.

Subsequently the vessels 2 are switched, whereby the vessel 2 that was drying, will now be regenerated, and vice versa, by appropriately switching the two valve blocks 5, 6.

Figure 2:
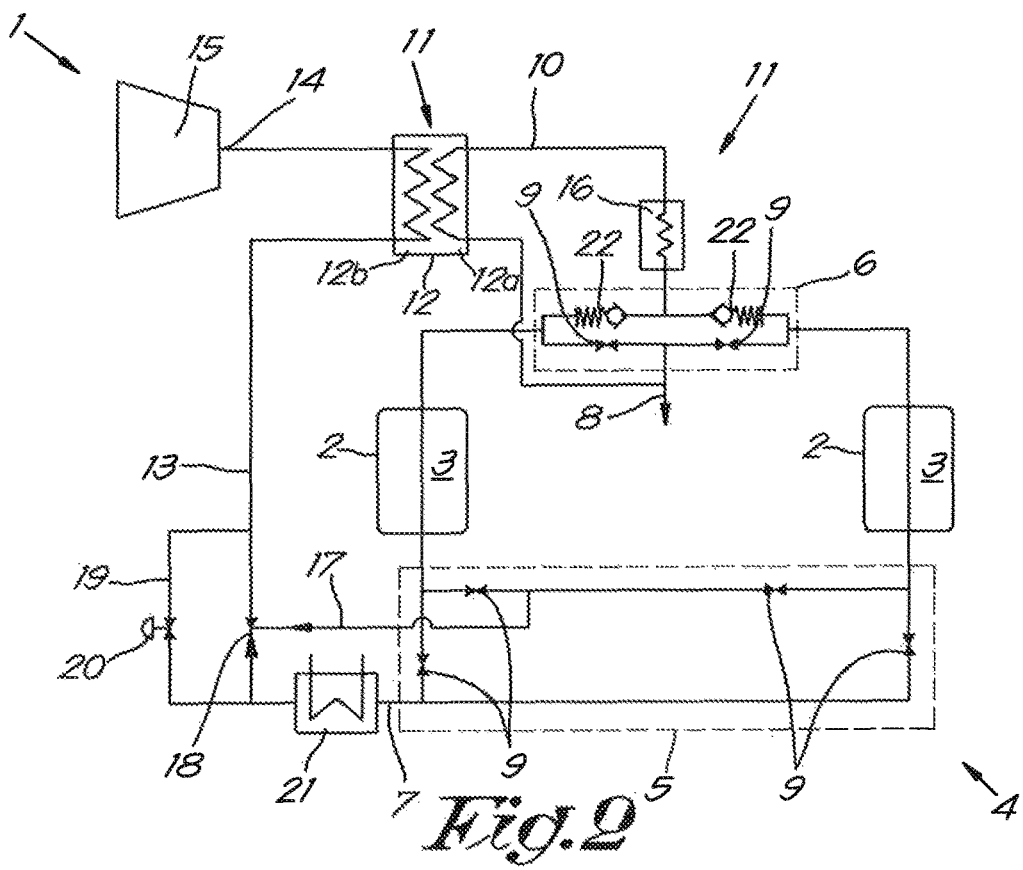
FIG. 2 shows an alternative embodiment of FIG. 1.
Figure 5:
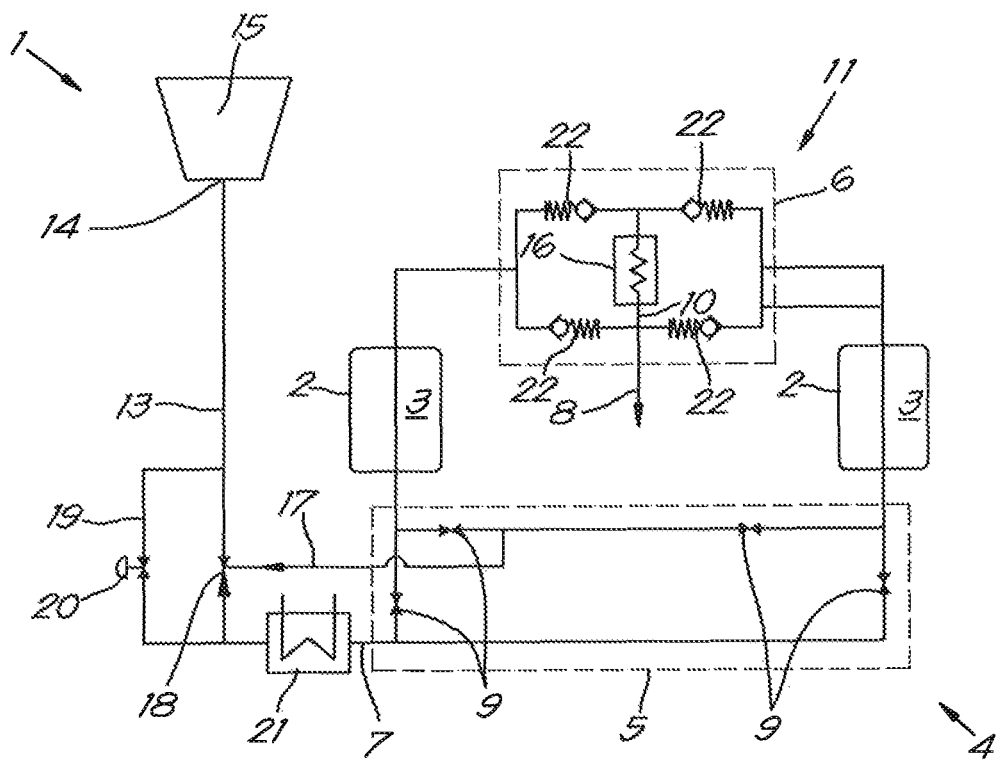

FIG. 2 shows a variant according to FIG. 1, whereby in this case the external heat source 16 is left out and whereby a part of the butterfly valves 9 in the second valve block 6, in this case two of the four present valves, are non-return valves 22.

For the rest, the drying device 1 and the operation thereof are analogue to the embodiment of FIG. 1.

It is clear that in the example of FIG. 1, a part of the butterfly valves 9, or all butterfly valves 9, in the second valve block 6 can be executed as non-return valves 22 or that the external heat source is left out.

FIG. 3 shows yet another variant, whereby in this case all valves of the second valve block 6 are executed as non-return valves 22.

Furthermore, the heat exchanger 12 is left out and the regeneration gas is only heated using an external heat source 16.

Obviously it is not excluded that the valves in the second valve block 6 are executed as butterfly valves 9, as shown in FIG. 1.

In all examples shown and described, a cooler 21 is present in the inlet pipe 13, downstream from the venturi ejector 18. It is not excluded that this cooler 21 is replaced by a first cooler mounted in the inlet pipe 13, upstream from the venturi ejector 18 and a second cooler mounted in the return pipe 17.

In all examples shown and described, the flow through the venturi ejector 18 is adjustable by means of the bypass 19 with valve 20.

However, it is not excluded that an adjustable venturi ejector 18 is used whereby the flow going through it can be regulated. This means: the venturi ejector 18 is itself adjustable, comparable to an adjustable valve.

Figure 4:
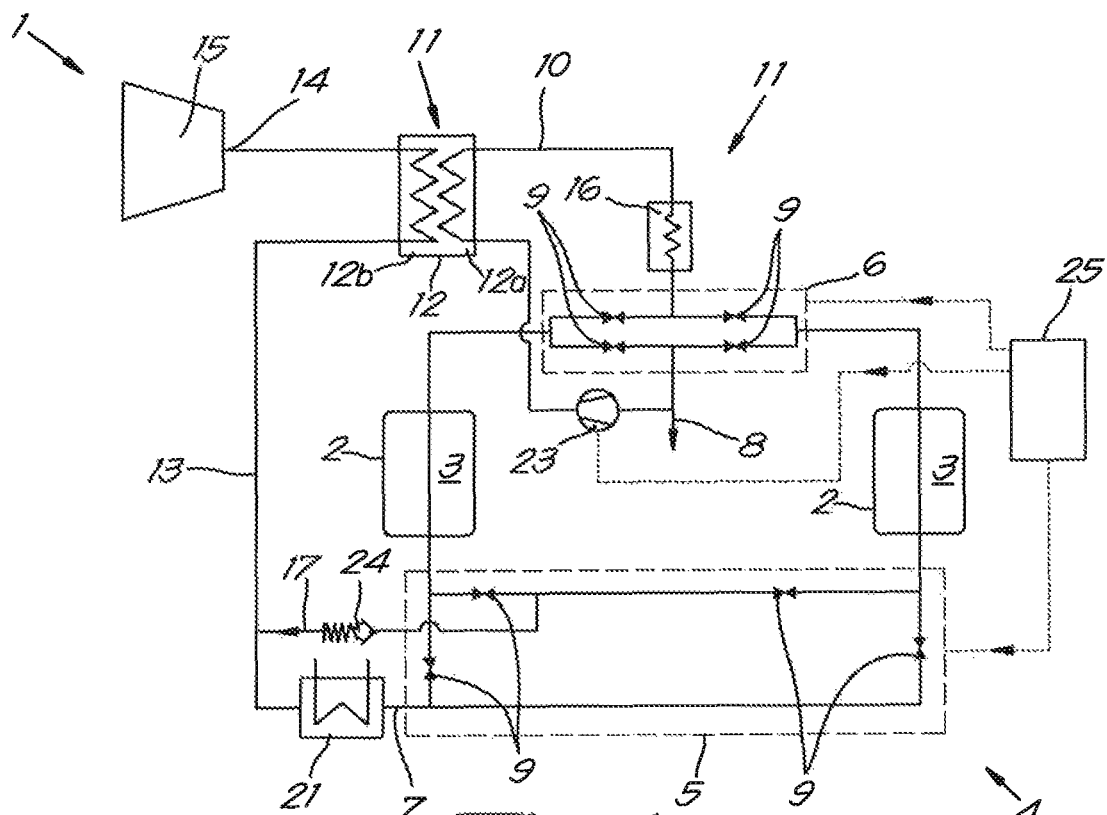
FIG. 4 schematically shows another variant of a drying device according to the invention.

FIG. 4 shows another variant of the invention.

This differs in its execution from FIG. 1 in that the venturi ejector 18 is left out and a blower 23 is mounted in the regeneration pipe 17.

This blower 23 is adjustable, which means that the flow of the regeneration gas can be regulated such that sufficient regeneration gas flows through the vessel to be regenerated 2, but also not more than necessary.

In other words, this variant provides an alternative for the venturi ejector 18.

In this case, but not necessarily for the invention, the blower is mounted upstream from the heating means 11, i.e. upstream from the heat exchanger 12.

A non-return valve 24 is also mounted in the return pipe 17 to prevent that the gas to be dried can unintentionally flow to the vessels 2 via the return pipe 17.

Finally, the drying device 1 is provided with a control unit 25, which will control the blower 12 and possibly also the adjustable valve system 4.

For the rest the operation is analogue to the operation of the embodiments described above.

Of course it is not excluded that the embodiments of FIGS. 1 to 3 are provided with a control unit 25, which can control the adjustable venturi ejector 18 and/or the valve 20 in the bypass pipe 19 and/or the adjustable valve system 4.

Furthermore, it is not excluded that such control unit 25 can control other components or elements of the drying device 1 as well.

The present invention is by no means limited to the embodiments described as an example and shown in the drawings, but a drying device according to the invention for drying compressed gas can be realised in all kinds of forms and dimensions, without departing from the scope of the invention.

The invention claimed is:

1. A drying device for drying compressed gas, said drying device being provided with an inlet for compressed gas to be dried and an outlet for dried compressed gas, whereby the drying device comprises at least two vessels, including a first vessel and a second vessel containing a regenerable desiccant and an adjustable valve system comprising a first valve block and a second valve block connecting said inlet, respectively said outlet, to said vessels, whereby the adjustable valve system is configured such that the first vessel dries the compressed gas while the second vessel is being regenerated, and that by regulating the valve system, the first and second vessels can each in turn dry compressed gas, wherein the drying device is further provided with a regeneration pipe for supplying a regeneration gas to the first or second vessel that is being regenerated, said regeneration pipe running from the outlet for dried compressed gas to the second valve block, whereby in the regeneration pipe heating means are provided for the regeneration gas, whereby the drying device is further provided with a return pipe for returning the regeneration gas after passage through the first or second vessel that is being regenerated to said inlet, said return pipe running from the first valve block to an inlet pipe which connects to said inlet for compressed gas to be dried, wherein a venturi ejector is mounted in the inlet pipe, to which said return pipe is connected, and wherein regulating means are provided for regulating the flow of compressed gas to be dried going through the venturi ejector.

2. The drying device according to claim 1, wherein said venturi ejector is an adjustable venturi ejector, which is configured to regulate the flow going through the adjustable venturi ejector.

3. The drying device according to claim 1, wherein said regulating means comprise a bypass pipe that is provided over the venturi ejector, whereby a valve is mounted in the bypass pipe.

4. The drying device according to claim 1, wherein said heating means comprise a heat exchanger, a primary section of which is mounted in the regeneration pipe and a secondary section is mounted in the inlet pipe.

5. The drying device according to claim 1, wherein said heating means comprise an external heat source.

6. The drying device according to claim 1, wherein a cooler is mounted in the inlet pipe, downstream from the venturi ejector.

7. The drying device according to claim 1, wherein a first cooler is mounted in the inlet pipe, upstream from the venturi ejector, and that a second cooler is mounted in the return pipe.

8. The drying device according to claim 1, wherein at least a part of the valves in the second valve block are non-return valves.

* * * * *